UNITED STATES PATENT OFFICE.

FRANK ROLLER, OF WEST BERKELEY, ASSIGNOR TO THE GIANT POWDER COMPANY, OF SAN FRANCISCO, CALIFORNIA.

MANUFACTURE OF EXPLOSIVES.

SPECIFICATION forming part of Letters Patent No. 474,529, dated May 10, 1892.

Application filed June 4, 1891. Serial No. 395,124. (No specimens.)

*To all whom it may concern:*

Be it known that I, FRANK ROLLER, a citizen of the United States, residing at West Berkeley, in the county of Alameda and State of California, have invented certain new and useful Improvements in the Manufacture of Explosives, of which the following is a specification.

My invention relates to the manufacture of explosives; and its object is to provide a protection against moisture for substances used in such manufacture.

Nitrate of ammonia is the most efficient of the salts now used in the manufacture of explosives; but at the same time it also is the most deliquescent and hygroscopic of the substances used in such manufacture. I therefore will describe my new coating or protection as applied to nitrate of ammonia, though I do not limit myself to its application to this substance.

My new coating or protection consists of colophony dissolved in oil, and I prepare it in the following manner, though I do not limit myself to the particular proportions and operation stated; I take, by weight, thirty-five per cent. of colophony, five per cent. of spermaceti, and sixty per cent. of a vegetable oil—such, for instance, as cotton-seed oil. These ingredients are heated together until the colophony and spermaceti are melted. The resulting compound when cooled is a substance of about the consistency of butter and of a brownish semi-transparent appearance, which will become fluid at about $+24°$ centigrade and will not become hard or brittle at $-10°$ centigrade.

Having thus prepared my coating compound, I prefer to apply it in the following manner: The nitrate of ammonia, in order to obtain the best results, should be reduced first to the finest degree of comminution practicable. Then it should be heated to a temperature sufficient to facilitate incorporation with the coating compound, which is then added in the proportion of thirteen parts of coating compound to eighty-seven parts of nitrate of ammonia, (though these proportions may be varied considerably,) and then the whole is stirred until a uniform incorporation has been effected. The stirring should be continued while the mass is cooling, after which it will be found granulated and each minute grain of nitrate covered or enveloped by the coating compound, or the coating compound and nitrate of ammonia may be put together cold and gradually heated to the necessary degree and stirred.

I do not limit myself to the particular oil named for dissolving the colophony. Other vegetable oils—such as linseed-oil or nut-oil—may be used, or any oil or combination of oils which will dissolve the colophony and bring it to the required consistency. As a substitute for spermaceti, paraffine in its solid form may be used. Of course equivalents of colophony also may be used.

I am aware that other devices have been used for this purpose. Petroleum and certain of its soft or viscous products or educts, as paraffine, are the most common, and I am also aware that rosin has heretofore been used or attempted to be used as a coating for nitrate of ammonia, but without success; but my invention is far more efficacious than any heretofore used.

I have found by experiments made with what is known as the "moisture-box," for the purpose of determining how much moisture the substance tested will absorb in a given time, that nitrate of ammonia coated with the best previously-known coating—to wit., vaseline—will gain in weight twenty-two one-hundredths of one per cent., while under the same conditions when coated with my compound it will gain only from five one-hundredths to eight one-hundredths of one per cent., the exposure in each case being simultaneous and for eighteen hours.

What I claim, and desire to secure by Letters Patent, is—

1. The explosive compound consisting of grains or particles of nitrate coated with a compound of colophony dissolved in oil, substantially as described.

2. The coating for nitrates or other gas-producing materials of an explosive compound, consisting of a compound of colophony and an oil in which the colophony is dissolved, substantially as described.

3. The coating for nitrates or other gas-producing materials of an explosive compound, consisting of a compound of colophony, spermaceti, and an oil in which the colophony is dissolved, substantially as described.

4. The coating for nitrates or other gas-producing material of an explosive compound, consisting of a compound of colophony and cotton-seed oil, substantially as described.

5. The explosive compound consisting of nitrate of ammonia coated with a compound consisting of colophony, a vegetable oil, and a solid fatty substance, such as spermaceti or paraffine, substantially as described.

In testimony whereof I affix my signature, in presence of two witnesses, this 20th day of May, 1891.

FRANK ROLLER.

Witnesses:
ROBERT E. O'CONNELL,
NATHAN A. DODGE.